United States Patent [19]

Lovell et al.

[11] Patent Number: 4,859,272

[45] Date of Patent: Aug. 22, 1989

[54] RADIAL TIRE BELT FOLDING DRUM

[75] Inventors: John A. Lovell, Munroe Falls; Gary E. Medved, Lyndhurst; John R. White, Wadsworth, all of Ohio

[73] Assignee: The Goodyear Tire & Rubber Company, Akron, Ohio

[21] Appl. No.: 210,391

[22] Filed: Jun. 22, 1988

[51] Int. Cl.$^4$ ............................................. B29D 30/22
[52] U.S. Cl. ................................... 156/415; 156/421.4
[58] Field of Search ................. 156/132, 401, 415, 416, 156/421.4, 414, 417, 418, 420

[56] References Cited

U.S. PATENT DOCUMENTS

| | | | |
|---|---|---|---|
| 2,603,580 | 7/1952 | Di Cicco et al. | 154/9 |
| 2,603,581 | 7/1952 | Ericson et al. | 154/9 |
| 2,943,668 | 7/1960 | Trevaskis et al. | 156/401 |
| 3,483,062 | 12/1969 | Madge | 156/401 |
| 3,576,693 | 4/1971 | Pacciarini | 156/417 |
| 3,644,162 | 2/1972 | Appleby et al. | 156/415 |
| 3,687,756 | 8/1972 | Appleby et al. | 156/111 |
| 3,787,262 | 1/1974 | Appleby et al. | 156/123 |
| 3,813,271 | 5/1974 | Riggs | 156/417 |
| 3,833,445 | 9/1974 | Mallory et al. | 156/132 X |
| 4,151,035 | 4/1979 | Jellison | 156/415 |
| 4,290,472 | 9/1981 | Bryant | 156/416 |
| 4,427,473 | 1/1984 | Shichman et al. | 156/421.4 X |
| 4,468,267 | 8/1984 | Irie | 156/132 |
| 4,482,416 | 11/1984 | Yasukochi et al. | 156/421.4 X |
| 4,510,012 | 4/1985 | Kawaida et al. | 156/415 |

Primary Examiner—Raymond Hoch
Attorney, Agent, or Firm—Frederick K. Lacher; T. P. Lewandowski

[57] ABSTRACT

A segmental drum (10) has spaced-apart inflatable turnup bladders (24) for folding each edge (28) of a belt (30) applied to the drum (10). The spacing of the bladders (24) is adjustable by axial movement in opposite directions of central hub assemblies (42,44) threaded on screws (76). Fine adjustment of the spacing to straigten the fold line (32) of each bladder (24) is provided by axial adjustment of rigid polyurethane bladder support brackets (18) connected to the central hub assemblies (42,44). Radial expansion of the segments (16) is provided by links (84) between each of the segments (16) and spaced drum expanding hub assemblies (86,88) threaded on a drum control screw (96). A molded central filler block (62) of rigid polyurethane is mounted on each segment (16) to fill the space between the bladder support brackets (18). A molded center sleeve (72) of stretchable resilient polyurethane material is positioned over the central filler blocks (62) of the segments (16) and may have a contoured outer surface (74) for shaping the belt (30).

14 Claims, 3 Drawing Sheets

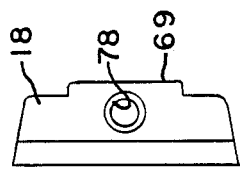
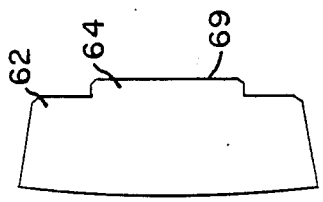
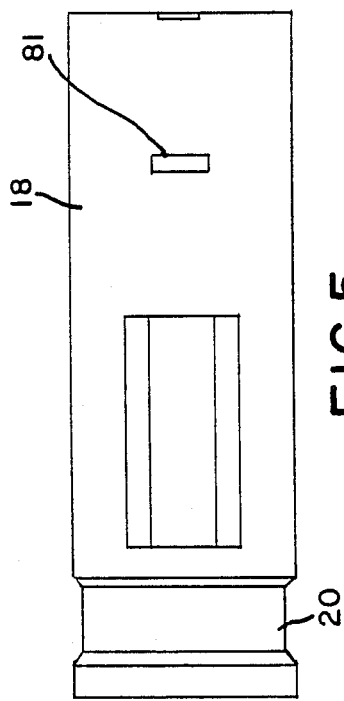
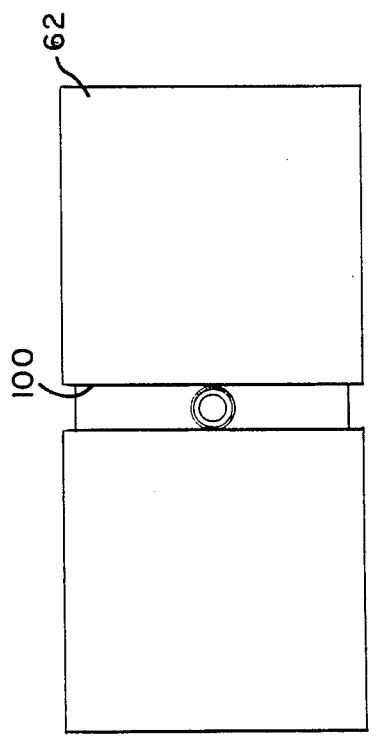

RADIAL TIRE BELT FOLDING DRUM

This invention relates generally, as indicated to a radial tire belt folding drum with spaced turnup bladders and especially to a drum which can be expanded and the space between the turnup bladders adjusted to accommodate a substantial range of belt widths and diameters.

In the past, drums have been expanded by expansion bladders and the radial movement of the segments was limited by hooks on the segments engaging control rings mounted on the drum shaft. In order to change the diameter of the drum, it was necessary to replace the control rings with rings of a different diameter which consumed valuable production time. To adjust the width of the space between the turnup bladders, fasteners on each drum segment had to be manually released to permit axial adjustment of the drum surface parts which were moved manually to a desired width. After the surface parts for each and every segment were adjusted manually, the fasteners had to be engaged with the segments which was also a time-consuming operation.

During the building of a belt package for a tire, the first wide belt is applied followed by the application of a number of narrow belts. The edges of the wide belt are then turned up over the narrow belts. One of the problems is to build the belt package and at the same time give it a shape to conform with the contour of a finished tire carcass built at another station. It has also been a problem to maintain the first wide belt in tension to provide tight fold lines. Changing the spacing between the turnup bladders has required replacing spacers mounted on the drum segments between the bladders and this has been costly when the spacers had to be machined metal parts. Another problem has been aligning the sections of each self-folding turnup bladder so that the fold line of the bladder is straight. This is especially costly when this alignment process has to be repeated every time the spacing between the bladders is changed.

The present invention is directed to a drum construction in which the drum is expandable to a number of different diameters and has an elastomeric cylindrical sleeve on which the belt package is built. This construction is advantageous for building different diameter belts and for the tensioning of the initial wide belt applied to the drum. Some parts must be replaced when the spacing between the bladders is changed; however, precision molded lightweight parts of a rigid polyurethane material are used which reduces the cost and labor required.

With the drum construction of this invention, alignment of the circumferential sections of the folding bladders to obtain a straight fold line is facilitated by adjusting bladder support brackets mounted on each of the segments. The bladder support brackets are connected to central hubs for adjusting the space between the bladders and therefore once the fold line adjustment for each folding bladder is made, it need not be made again even though the distance between the bladders is lengthened or shortened.

In accordance with an aspect of this invention there is provided a rotatable belt folding drum comprising a rotatable belt folding drum comprising a rotatable, cylindrical main shaft, a pair of central hub assemblies slidably mounted on said main shaft at opposite sides of a centerplane of said drum, a plurality of circumferentially spaced drum segments disposed in a generally cylindrical configuration around said central hub assemblies, each of said drum segments being slidably mounted on said pair of central hub assemblies for radial movement of each of said drum segments relative to said central hub assemblies, a pair of annular turnup bladders positioned around said drum segments and each of said bladders having a cavity in communication with a source of fluid pressure, each of said bladders being connected to one of said pair of central hub assemblies for axial adjusting movement with said one of said pair of central hub assemblies, spacing screw means in threaded engagement with said central hub assemblies, said screw means being rotatable for moving said central hub assemblies in opposite directions to lengthen and shorten the distance between said bladders, a pair of drum expanding hub assemblies slidably mounted on said main shaft at positions spaced axially from said central hub assemblies and at opposite sides of said central hub assemblies from said centerplane, link means connecting each of said drum expanding hub assemblies with an opposite end of each of said segments, drum diameter screw means in threaded engagement with said drum expanding hub assemblies and said drum diameter screw means being rotatable for expanding and contracting said segments.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

FIG. 5 is a plan view of one of the bladder support brackets shown in FIG. 1.

FIG. 6 is an end view of the bladder support bracket shown in FIG. 5.

FIG. 7 is a plan view of one of the central filler blocks shown in FIG. 1.

FIG. 8 is an end view of the central filler block shown in FIG. 7.

Figure 1:
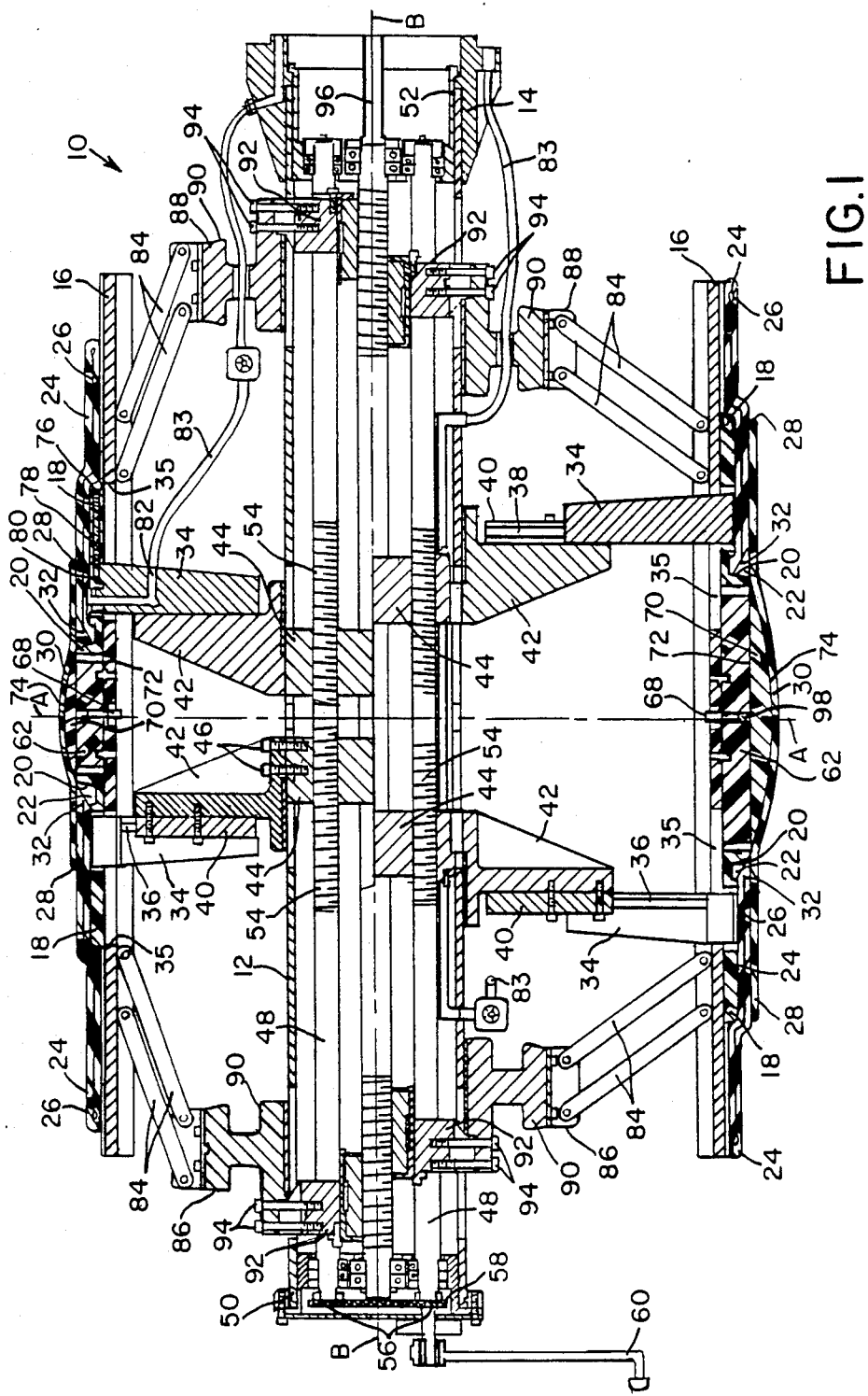
FIG. 1 is a schematic sectional view showing one of the drum segments embodying the invention in the contracted condition with the space between the turnup bladders in the shortened condition. Another drum segment embodying the invention is shown in the expanded condition with the space between the bladders in the lengthened condition.
Figure 2:
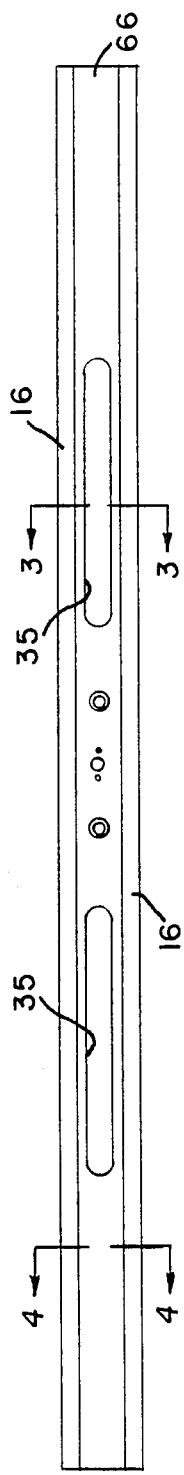
FIG. 2 is a plan view of one of the drum segments shown in FIG. 1.

Referring to the drawings and especially to FIG. 1, a rotatable belt folding drum 10 is shown having a cylindrical main shaft 12 mounted on a drive shaft 14 rotatably supported in a housing (not shown). The belt folding drum 10 has a plurality of circumferentially spaced drum segments 16 positioned around the main shaft 12 and expandable from the diameter shown in the upper part of FIG. 1 to the diameter shown in the lower part of FIG. 1.

A bladder support bracket 18, shown more clearly in FIGS. 5 and 6, is slidably mounted on each of the segments 16 at each side of a centerplane A—A of the drum 10. The bladder support bracket 18 has a groove 20 for seating a nose portion 22 of a turnup bladder 24 positioned around the drum segments 16. A turnup bladder 24 is positioned at each side of the centerplane A—A and has a cavity 26 for inflation. The turnup bladder 24 may be of a resilient material such as rubber reinforced with plies of fabric in such a manner that upon inflation the end of the bladder will turn up an edge 28 of a radial tire belt 30 on the drum 10 about a fold line 32 of the bladder.

Each bladder support bracket 18 is connected to a slider bar 34 extending through slots 35 in the segments 16. The slider bar 34 has ribs 36 in sliding engagement with radially extending grooves 38 in plates 40 mounted on central hub assemblies which include central outer hubs 42 and central inner hubs 44. The central outer hubs 42 are annular and have a cylindrical inner surface slidably mounted on the outer surface of the main shaft 12. The central outer hubs 42 are connected to the central inner hubs 44 by fasteners such as bolts 46 extending through slots in the main shaft 12. The distance between the bladders 24 on one side of the centerplane A—A and the bladder on the other side is controlled by spacing screws 48 extending from an outboard end 50 to an inboard end 52 of the main shaft 12. The spacing screws 48 have threaded portions 54 in threaded engagement with the central inner hubs 44. The threaded portions 54 have threads of opposite hand at positions on opposite sides of the centerplane A—A for moving the central inner hubs 44 in opposite directions upon rotation of the spacing screws 48 to lengthen or shorten the distance between the bladder support bracket 18 connected to the slider bar 34 at one side of the centerplane A—A and the bladder support bracket connected to the slider bar on the other side of the centerplane for each of the segments 16. The spacing screws 48 have sprockets 56 at the outboard end 50 which are engaged by a chain 58. A crank 60 may be mounted on the outboard end of one of the spacing screws 48 for turning the screw and the sprockets 56 causing the central inner hubs 44 to move in opposite directions depending upon the direction of rotation of the screws. In this way, the space between the bladder support bracket 18 connected to one of the central outer hubs 42 and the bladder support bracket connected to the other of the central outer hubs can be lengthened or shortened as desired.

The space between the bladder support brackets 18 is filled with a central filler block 62 shown more clearly in FIGS. 7 and 8. The central filler block 62 has a rib 64 for seating in a groove 66 of one of the drum segments 16. Fasteners 68 may extend between the central filler block 62 and one of the segments 16 for holding the block in place. As shown in FIGS. 6 and 8, each bladder support bracket 18 and central filler block 62 has a matching surface 69 for engagement with a supporting surface of each of the segments 16. In this way, each bladder support bracket 18 and central filler block 62 will be stressed in compression in operation and need not be of a material having strength in tension.

Radially outward of the central filler block 62 on each of the segments 16 is positioned a stretchable cylindrical sleeve 70 of resilient material having a cylindrical inner surface 72 for seating on the central filler block of each of the drum segments 16. The cylindrical sleeve 70 may also have a contoured radially outer surface 74 for shaping the belt 30 and the other belts of the belt package.

The inflatable turnup bladder 24 mounted on the bladder support bracket 18 at each side of each of the drum segments 16 is designed to fold over at the fold line 32; however, the axial position of the fold line at different circumferential sections of the bladder may vary. An adjustable connection between each slider bar 34 and each bladder support bracket 18 includes an adjusting screw 76 rotatably mounted in a hole 78 and threaded in a threaded hole 80 in the slider bar 34. The adjusting screw 76 is prevented from moving axially in the hole 78 by a collar in a slot 81 in the bladder support bracket 18, shown in FIG. 5, so that upon rotation of the adjusting screw relative axial movement of the bladder support bracket on the drum segment 16 is provided to position the fold line 32 in a single plane perpendicular to the axis of the main shaft 12. This adjustment for each of the drum segments 16 can be made by projecting a lighted line on the drum surface at the fold line 32 prior to applying the belt 30. The bladder 24 may then be inflated to determine the actual position of the fold line 32. Then the adjusting screw 76 for each of the segments 16 may be rotated where the fold line 32 does not match with the projected lighted line until the fold line coincides with the lighted guide line on the drum surface. Once the bladder support bracket 18 of each of the segments 16 has been adjusted to set the fold line 32 for that particular section of the turnup bladder 24, no additional adjustment of the fold line is required even though the space between the bladder support bracket 18 on one side of the centerplane A—A and the bladder support bracket on the other side is shortened or lengthened by turning of the spacing screws 48 with the crank 60. Inflation of the inflatable turnup bladders 24 is provided through passages 82 in at least one slider bar 34 connected by suitable conduits 83 to a source of air pressure such as factory air.

Figure 4:
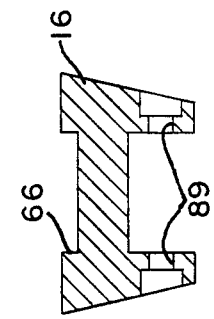
FIG. 4 is a cross-sectional view taken along line 4—4 in FIG. 2.
Figure 3:
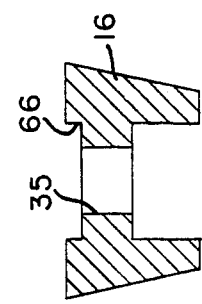
FIG. 3 is a cross-sectional view taken along line 3—3 in FIG. 2.

In order to expand or contract the belt folding drum 10, each of the drum segments 16 is connected by a pair of links 84 to drum expanding hub assemblies 86 and 88 at positions on opposite sides of the centerplane A—A and spaced outside the central hub assemblies. The links 84 may be pivotally connected to the segments 16 by pins extending through holes 89 in the segments, as shown in FIG. 4. Each of the drum expanding hub assemblies 86 and 88 has an outer drum expanding hub 90 slidably mounted on the main shaft 12 and connected to an inner drum expanding hub 92 by suitable fasteners such as bolts 94. The inner drum expanding hub 92 of each of the drum expanding hub assemblies 86 and 88 is threaded for threaded engagement with a drum diameter control screw 96 rotatably mounted at the inboard end 52 and outboard end 50 of the main shaft 12. The threads of the drum diameter control screw 96 in engagement with the inner drum expanding hub 92 of the drum expanding hub assembly 88 are of opposite hand to the threads in engagement with the inner drum expanding hub of the drum expanding hub assembly 86 so that upon rotation of the drum diameter control screw in one direction, the drum expanding hub assembly 86 will be moved away from the drum expanding hub assembly 88 to decrease the diameter of the drum 10. Upon rotation of the drum diameter control screw 96 in the opposite direction, the drum expanding hub assembly 86 will be moved toward the drum expanding hub assembly 88 causing the segments 16 to move radially outward. The drum diameter control screw 96 may be connected to a suitable drive means and controls set and calibrated so that the desired diameter of the drum 10 can be provided by selected positioning of the drum expanding hub assemblies 86 and 88 through rotation of the drum diameter control screw. Initial expansion of the drum 10 to stretch the belt 30 after application on the drum may also be provided by rotating the drum diameter control screw 96 so as to expand the segments 16 a desired amount.

It can be seen from comparing the drum diameters and spacing between the bladder support brackets 18, in FIG. 1, that the drum 10 can be adjusted to build radial tire belt packages over a wide range of widths and diameters. No assembly or disassembly is required when the diameter of the drum 10 is adjusted; however, in some instances, the cylindrical sleeve 70 may be replaced with a sleeve having a different diameter.

The cylindrical sleeve 70 is preferably of a stretchable, resilient polyurethane composition having a hardness of about 80 Shore A with a controlled modulus of elasticity in the range of about 300 to about 450 psi at 20 percent elongation, and in the range of about 475 to about 600 psi at 50 percent elongation. The cylindrical sleeve 70 also has an ultimate tensile strength in the range of about 2,000 to about 3,000 psi and a trouser (split) tear resistance of at least 100 lbs/inch. Preferably, the sleeve 70 is elongated not more than 50 percent. The cylindrical sleeve 70 may be stretched to 50 percent elongation over 100 cycles with the permanent set being less than one percent insuring the return of the sleeve to its original position upon contraction of the drum 10. This is important so that a centering rib 98 on a cylindrical inner surface 72 of the sleeve 70 remains in engagement with a center slot 100 in the central filler block 62.

It has been found that by adding an extra amount of reactive, built-in silicone to the polyurethane molding mixture, a green rubber release on the surface is provided. By including a small amount of blowing agent, such as chlorofloro hydrocarbon, in the mixture the material is expanded into the mold so that the molded sleeve 70 will have substantially the same dimensions as the mold. Also the blowing agent is carried to the surface and forms a skin which is substantially nonporous.

In designing the cylindrical sleeve 70, the resistance to expansion of the segments 16 must be less than the forces available for expanding the segments.

It has been found that each central filler block 62 and each bladder support bracket 18 may be made of a rigid, foamed polyurethane composition having a Young's modulus of about 90,000 psi with a yield module of about 130,000 psi, an ultimate elongation of less than 10 percent, a Gardner impact of over 140 inch pounds, a Shore D hardness of at least 50 and a density of from about 30 to 40 lbs/cubic foot and preferably about 31 to 33. By molding these parts of rigid, foamed polyurethane, the parts can be molded to the desired dimensions without requiring extensive machining. The parts have dimensional stability and will not change shape after being used for a period of time. The parts are relatively light in weight and resist denting or other damage during handling and in operation. When the space between each bladder support bracket 18 and the other support bracket on one of the segments is changed, it is necessary to replace the central filler block 62 with a filler block 62 of another length. The central filler block 62 may be molded at one length and then cut-to-length by a band saw at the factory. By molding the central filler block 62 and bladder support bracket of rigid, foamed polyurethane it is possible to provide precision parts which do not require extensive machining.

In operation, the belt folding drum 10 is set to provide the desired spacing between the bladder support bracket 18 on one side of each of the segments 16 and the bladder support bracket on the other side of each of the segments by turning the crank 60 in the desired direction which causes the spacing screws 48 to turn and move the central inner hubs 44 and central outer hubs 42 apart or together the desired amount. Fine tuning is provided by turning the adjusting screw 76 in the bladder support bracket 18 for each of the segments 16 until the fold line 32 of each bladder 24 is in a single plane perpendicular to an axis B—B of the main shaft 12. A central filler block 62 of the appropriate length is fastened to each of the segments 16 and a cylindrical sleeve 70 of desired diameter is resiliently stretched over the central filler blocks. The desired diameter of the drum 10 may then be provided by turning the drum diameter control screw 96 a predetermined amount causing the drum expanding hub assembly 86 to move closer or farther apart from the drum expanding hub assembly 88. The drum 10 is then rotated on the drive shaft 14 and the initial belt 30 wrapped around the drum. With this construction, the segments 16 may be expanded an additional amount by rotating the drum diameter control screw 96 and thereby place the initial belt 30 in tension. This is important for providing a tight fold without trapped air.

Additional belts may then be wrapped around the initial belt 30 and finally each edge 28 of the initial belt folded around the other belts by inflating the turnup bladder 24 on each side of the drum 10. This is accomplished by communicating air through the conduits 83 to the passages 82 in a slider bar 34 on each side of the centerplane A—A. After each edge 28 is folded over the belt package, the bladder 24 on each side of each of the drum segments 16 is deflated and the drum segments retracted by turning the drum diameter control screw 96 to retract the segments so that the finished belt package may be removed from the drum 10.

While a certain representative embodiment and details have been shown for the purpose of illustrating the invention, it will be apparent to those skilled in the art that various changes and modifications may be made therein without departing from the spirit or scope of the invention.

What is claimed is:

1. A rotatable belt folding drum comprising a rotatable, cylindrical main shaft, a pair of central hub assemblies slidably mounted on said main shaft at opposite sides of a centerplane of said drum, a plurality of circumferentially spaced drum segments disposed in a generally cylindrical configuration around said central hub assemblies, each of said drum segments including slider members slidably mounted on said pair of central hub assemblies for radial movement of each of said drum segments relative to said central hub assemblies, a pair of annular turnup bladders positioned around said drum segments and each of said bladders having a cavity in communication with a source of fluid pressure, each of said drum segments including bladder support means slidably mounted on each of said drum segments and adjustably connected to said slider members for axial adjustment of said bladder support means at each end of said drum segments, said pair of turnup bladders being mounted on said bladder support means for axial adjusting movement with said bladder support means, spacing screw means in threaded engagement with said central hub assemblies, said screw means being rotatable for moving said central hub assemblies in opposite directions to lengthen and shorten the distance between said bladders, a pair of drum expanding hub assemblies slidably mounted on said main shaft at positions spaced axially from said central hub assemblies and at opposite sides of said central hub assemblies from said centerplane, link means connecting each of said drum expanding hub assemblies with an opposite end of each of said segments, drum diameter screw means in threaded engagement with said drum expanding hub assemblies and said drum diameter screw means being rotatable for expanding and contracting said segments.

2. A rotatable belt folding drum according to claim 1 wherein said slider members include a pair of radially extending slider bars slidably mounted on said pair of central hub assemblies to guide the radial movement of each of said drum segments relative to said central hub assemblies.

3. A rotatable belt folding drum according to claim 2 wherein said bladder support means includes a pair of bladder support brackets slidably mounted on a radially outer surface of each of said drum segments and adjustably connected to one of said slider bars for axial adjustment of said bladder support brackets at each end of each of said drum segments, and said pair of annular turnup bladders being mounted on said pair of bladder support brackets for movement with the brackets.

4. A rotatable belt folding drum according to claim 3 wherein each of said drum segments includes a central filler block mounted on each of said drum segments between said bladder support brackets.

5. A rotatable belt folding drum according to claim 4 wherein said central filler block and said support brackets have matching surfaces for engagement with said radially outer surface of said of said drum segments so that the radial stresses imposed on said central filler block and said support brackets in operation will be mainly in compression.

6. A rotatable belt folding drum according to claim 5 wherein said central filler block and said bladder support brackets are of a rigid foamed polyurethane composition having a Young's modulus of about 90,000 with a yield module of about 130,000 psi, an ultimate elongation of less than 10 percent, a Gardner impact of over 140 inch pounds, a Shore D hardness of at least 50 and a density of from about 30 to 40 pounds per cubic foot.

7. A rotatable belt folding drum according to claim 4 including a generally cylindrical stretchable sleeve of resilient material having a cylindrical radially inner surface for mounting on said central filler block of each of said segments and having a contoured radially outer surface for shaping a belt applied to said outer surface.

8. A rotatable belt folding drum according to claim 7 including means to rotate said drum diameter screw means to stretch said stretchable sleeve after application of at least one belt to shape and stress said belt in tension.

9. A rotatable belt folding drum according to claim 7 wherein said stretchable sleeve is of a stretchable resilient polyurethane composition having a hardness of 80 Shore A with a controlled modulus of elasticity in the range of about 300 to about 450 psi at 20 percent elongation and in the range of about 475 to about 600 psi at 50 percent elongation, an ultimate tensile strength in the range of about 2000 to about 3000 psi, and a trouser (split) tear resistance of at least 100 pounds per inch.

10. A rotatable belt folding drum according to claim 3 wherein each of said turnup bladders is self-folding about a nose portion and including means to adjust each of said bladder support brackets on each of said drum segments individually to position circumferentially spaced sections of said nose portion in a direction axially of the drum segments so that a fold line of said turnup bladder is substantially located in a single plane perpendicular to the axis of said main shaft.

11. A rotatable belt folding drum according to claim 1 wherein said link means includes a pair of links connecting each of said drum expanding hub assemblies with an opposite end of each of said segments.

12. A rotatable belt folding drum according to claim 10 wherein said drum expanding hub assemblies include a pair of drum expanding outer hubs slidably mounted on said main shaft and a pair of drum expanding inner hubs positioned inside said main shaft and connected to said drum expanding outer hubs and said drum diameter screw means including a screw extending through said main shaft and in threaded engagement with said drum expanding inner hubs.

13. A rotatable belt folding drum comprising a rotatable, cylindrical main shaft;
a pair of central hubs slidably mounted on said main shaft at opposite sides of a centerplane of said drum;
a plurality of circumferentially spaced drum segments disposed in a generally cylindrical configuration around said central hubs;
each of said drum segments having a pair of radially extending slider bars slidably mounted on said pair of central hubs for radial movement of each of said drum segments relative to said central hubs;
each of said drum segments having a pair of bladder support brackets slidably mounted on a radially outer surface of each of said segments and adjustably connected to said slider bars for axial adjustment of said bladder support brackets at each end of each of said segments;
a pair of annular inflatable turnup bladders positioned around said drum segments and each of said bladders having a cavity in communication with a source of fluid pressure;
each of said central hubs being connected to a corresponding central inner hub positioned inside said main shaft;
a central hub assembly spacing screw extending through said main shaft and in threaded engagement with said central inner hubs, said screw having threads of opposite hand at positions on opposite sides of said centerplane for moving said central inner hubs in opposite directions upon rotation of said spacing screw to lengthen or shorten the distance between said bladder support brackets;
a central filler block mounted on each of said drum segments between said bladder support brackets;
a generally cylindrical, stretchable sleeve of resilient material having a cylindrical radially inner surface for mounting on a surface of said central filler block of each of said segments, said sleeve having a contoured radially outer surface for shaping the belt applied to said outer surface;
a pair of drum expanding outer hubs slidably mounted on said main shaft at positions spaced axially from said central hubs and at opposite sides of said central hubs from said centerplane;
a pair of links connecting each of said drum expanding outer hubs with an opposite end of each of said segments;

a pair of drum expanding inner hubs positioned inside said main shaft and connected to said drum expanding outer hubs;

a drum diameter control screw extending through said main shaft and in threaded engagement with said drum expanding inner hubs and said screw having threads of opposite hand at positions on opposite sides of said centerplane for expanding and contracting said segments upon rotation of said screw in predetermined directions; and means to rotate said drum diameter control screw to stretch said sleeve after application of at least one belt to stress said belt in tension.

14. A rotatable belt folding drum comprising a rotatable, cylindrical main shaft;

a pair of central hubs slidably mounted on said main shaft at opposite sides of a centerplane of said drum;

a plurality of circumferentially spaced drum segments disposed in a generally cylindrical configuration around said central hubs;

each of said drum segments having a pair of radially extending slider bars slidably mounted on said pair of central hubs for radial movement of each of said drum segments relative to said central hubs;

each of said drum segments having a pair of bladder support brackets slidably mounted on a radially outer surface of each of said segments and means for adjustably connecting said bladder support brackets to said slider bars for axial adjustment of said bladder support brackets at each end of each of said segments;

a pair of annular inflatable turnup bladders positioned around said drum segments and each of said bladders having a cavity in communication with a source of fluid pressure;

each of said central hubs being connected to a corresponding central inner hub positioned inside said main shaft;

a central hub assembly spacing screw extending through said main shaft and in threaded engagement with said central inner hubs, said screw having threads of opposite hand at positions on opposite sides of said centerplane for moving said central inner hubs in opposite directions upon rotation of said spacing screw to lengthen or shorten the distance between said bladder support brackets;

said means for adjustably connecting said bladder support brackets and said slider bars being operable independently of the operation of said central hub assembly spacing screw for individual adjustment of each of said bladder support brackets to align the fold lines of said bladders;

a pair of drum expanding outer hubs slidably mounted on said main shaft at positions spaced axially from said central hubs and at opposite sides of said central hubs from said centerplane;

a pair of links connecting each of said drum expanding outer hubs with an end of each of said segments;

a pair of drum expanding inner hubs positioned inside said main shaft and connected to said drum expanding outer hubs; and a drum diameter control screw extending through said main shaft and in threaded engagement with said drum expanding inner hubs, said screw having threads of opposite hand at positions on opposite sides of said centerplane for expanding and contracting said segments upon rotation of said screw in predetermined directions.

* * * * *